(12) United States Patent
Anspaugh et al.

(10) Patent No.: US 12,319,339 B2
(45) Date of Patent: Jun. 3, 2025

(54) CUSTOMIZABLE ENERGY ABSORPTION STRAP ASSEMBLY FOR STEERING SYSTEM

(71) Applicant: Steering Solutions IP Holding Corporation, Saginaw, MI (US)

(72) Inventors: Michael P. Anspaugh, Bay City, MI (US); Randy W. Jones, North Branch, MI (US); Kenton Waineo, Saginaw, MI (US); Leslie E. Edmundson, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/624,832

(22) Filed: Apr. 2, 2024

(65) Prior Publication Data

US 2024/0336297 A1    Oct. 10, 2024

Related U.S. Application Data

(60) Provisional application No. 63/457,836, filed on Apr. 7, 2023.

(51) Int. Cl.
*B62D 1/19* (2006.01)
(52) U.S. Cl.
CPC .................... *B62D 1/195* (2013.01)
(58) Field of Classification Search
CPC ...................................... B62D 1/195
See application file for complete search history.

(56) References Cited

U.S. PATENT DOCUMENTS

| | | | | |
|---|---|---|---|---|
| 6,655,716 B2* | 12/2003 | Riefe | ..... | B62D 1/195 |
| | | | | 188/374 |
| 9,834,246 B1* | 12/2017 | Woycik | ..... | B62D 1/195 |
| 11,173,946 B2* | 11/2021 | Rietzler | ..... | B62D 1/184 |

FOREIGN PATENT DOCUMENTS

| | | |
|---|---|---|
| DE | 102021125699 A1 | 4/2022 |
| DE | 102022133146 A1 | 6/2023 |
| DE | 102022133157 A1 | 6/2023 |

OTHER PUBLICATIONS

English translation of Office Action regarding corresponding DE App. No. 10 2024 109 569.5; issued Dec. 18, 2024.

* cited by examiner

*Primary Examiner* — Jason D Shanske
*Assistant Examiner* — Matthew James O'Neill
(74) *Attorney, Agent, or Firm* — Dickinson Wright PLLC (57) ABSTRACT

A steering column assembly includes a lower jacket. The steering column assembly also includes an upper jacket in telescoping engagement with the lower jacket. The steering column assembly further includes an energy absorbing strap having a first leg portion, a second leg portion and a curved portion connecting the first leg portion and the second leg portion, the first leg portion coupled to the upper jacket, wherein the first leg portion, the second leg portion and the curved portion define a single integrally formed structure. The steering column assembly yet further includes a protrusion extending from the energy absorbing strap and disposed within a slot defined by the upper jacket.

10 Claims, 7 Drawing Sheets

CUSTOMIZABLE ENERGY ABSORPTION STRAP ASSEMBLY FOR STEERING SYSTEM

CROSS-REFERENCE TO RELATED APPLICATION

This patent application claims the benefits of priority to U.S. Provisional Patent Application Ser. No. 63/457,836, filed Apr. 7, 2023, the disclosure of which is incorporated by reference herein in its entirety.

FIELD OF THE INVENTION

The embodiments described herein relate to vehicle steering systems and, more particularly, to a customizable energy absorption strap assembly.

BACKGROUND

A steering column assembly of a vehicle may include one or more energy absorption features. For example, an energy absorption strap (EA strap) assembly may be operatively coupled to an upper jacket and configured to unroll once a specified collapse load is exceeded. On adjustable steering columns, energy absorbing straps are utilized to absorb an occupant's mass during a collapse event of the steering column.

Vehicle OEMs typically request the ability to tune one or more characteristics, such as the crash stroke energy absorption (EA) load, initial breakaway, and/or load profile duration, for example. The performance characteristics could require the ability to control the initial breakaway with a wide range of initial peak loads followed by a low load zone (i.e., delayed energy absorption) which transitions to a final running load zone. The requirement is particularly challenging when the delay zone is very low or offset from the requested running load zone. In addition, OEMs may request to obtain similar performance characteristics on both a power and manual steering column assembly that are used on the same program.

SUMMARY

According to one aspect of the disclosure, a steering column assembly includes a lower jacket. The steering column assembly also includes an upper jacket in telescoping engagement with the lower jacket. The steering column assembly further includes an energy absorbing strap having a first leg portion, a second leg portion and a curved portion connecting the first leg portion and the second leg portion, the first leg portion coupled to the upper jacket, wherein the first leg portion, the second leg portion and the curved portion define a single integrally formed structure. The steering column assembly yet further includes a protrusion extending from the energy absorbing strap and disposed within a slot defined by the upper jacket.

According to another aspect of the disclosure, a steering column assembly includes a lower jacket. The steering column assembly also includes an upper jacket in telescoping engagement with the lower jacket. The steering column assembly further includes an energy absorbing strap having a first leg portion and a second leg portion, wherein the first leg portion and the second leg portion are separate components connected with a shear pin. The steering column assembly yet further includes at least one protrusion extending from the first leg portion into a slot defined by the second leg portion.

According to another aspect of the disclosure, a steering column assembly includes a jacket having a first interaction feature. The steering column assembly also includes an energy absorbing strap operatively coupled to the jacket with at least one mechanical fastener to resist relative movement between the jacket and the energy absorbing strap up to a predetermined load, the energy absorbing strap having a second interaction feature, wherein the jacket moves relative to the energy absorbing strap over a predetermined length to detail activation of a running load, wherein engagement of the first interaction feature and the second interaction feature activates the running load.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steerby-wire and driver interface steering. These steering system schemes typically include a steering column assembly for translating steering input to an output that interacts with a steering linkage to ultimately cause the vehicle wheels to turn. Steering columns include various safety features, such as airbags to lessen impact forces. In addition, many steering column assemblies are collapsible and include one or more energy absorption features, such as energy absorbing straps, that allow a certain amount of compression.

The embodiments disclosed herein may benefit any suitable vehicle, such as a car, a truck, a sport utility vehicle, a mini-van, a crossover, any other passenger vehicle, any suitable commercial vehicle, or any other suitable vehicle. While the vehicle may be a passenger vehicle having wheels and for use on roads, the principles of the present disclosure may apply to other vehicles, such as planes, tractors, boats, or other suitable vehicles. The vehicle may include a propulsion system, such as an ignition system, an electric system, or combinations thereof.

Figure 1:
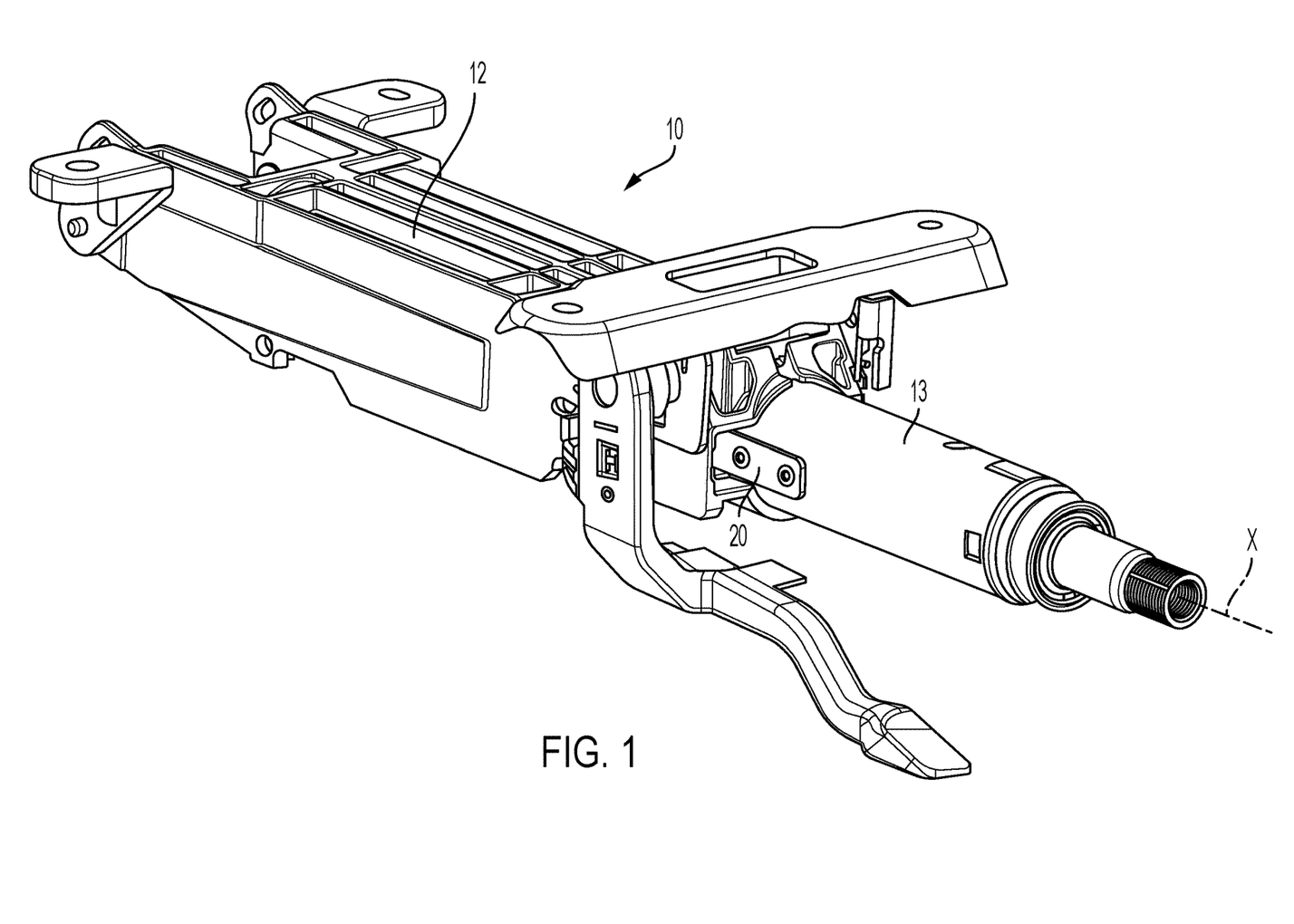
FIG. 1 is a perspective view of a portion of a steering column assembly.

Referring now to FIG. 1, the vehicle includes a steering column assembly 10. The steering column assembly 10 may be configured as a driver interface steering system, an autonomous driving system, or a system that allows for both driver interface and autonomous steering. The steering column assembly 10 may include an input device (not shown), such as a steering wheel, which allows a driver to mechanically provide a manual steering input by turning the steering wheel.

The steering column assembly 10 extends about a longitudinal axis X. The steering column assembly 10 may be adjustable in a telescopic direction substantially parallel with the longitudinal axis X (i.e., adjustable along the longitudinal axis X), and may be adjustable in a rake direction in some embodiments. The steering column assembly 10 includes a lower jacket 12 and an upper jacket 13 extending about the longitudinal axis X. The upper jacket 13 has a portion extending into the lower jacket 12 and is translatable therein. A steering shaft 14 is rotatably disposed within the upper jacket 13 and the lower jacket 12. The steering shaft may be one of a plurality of operatively coupled steering shafts to form a shaft assembly in some embodiments.

The upper jacket 13 is movable, relative to the lower jacket 12, during a normal operating condition of the vehicle to telescopically adjust a position of the steering wheel along the longitudinal axis "X." The normal operating condition (also referred to herein as a first condition of the steering column) is defined as a normal driving condition that allows adjustment of the upper jacket 13 over a predefined range of telescoping movement that is suitable for driving.

The steering column 10 is also operable in a second operating condition defined as a collapse of the upper jacket 13 during an energy absorbing event. In this condition, energy-absorbing movement (i.e., energy absorbing collapsibility) of the upper jacket 13 along the longitudinal axis "X" within the lower jacket 12 is provided. To assist with the energy absorbing process during a collapse event, and to reduce the number of components and assembly complexity, an energy absorbing strap assembly is disclosed herein. The energy absorbing strap assembly is generally referenced with numeral 20.

Figure 2:
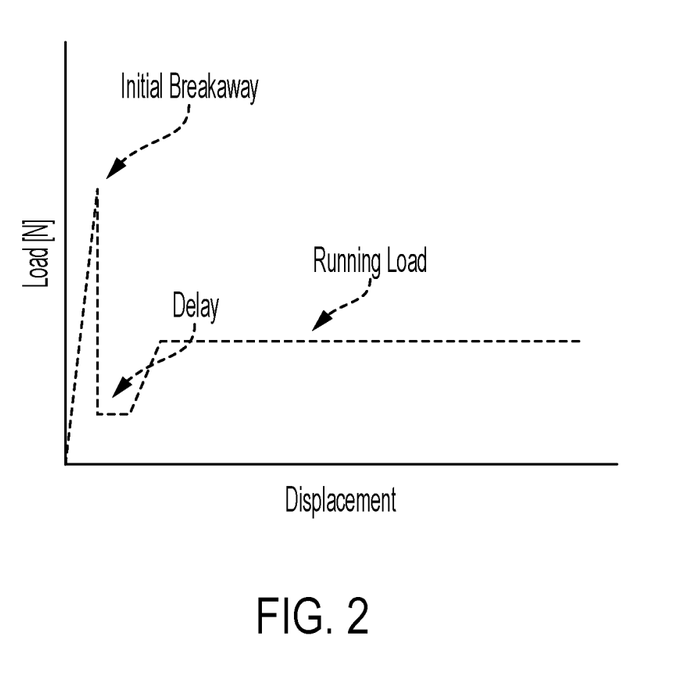
FIG. 2 is a plot of load vs. displacement associated with an energy absorbing strap assembly of the steering column assembly.

Referring to FIG. 2, a plot of an example load profile requirement over a displacement range for an energy absorbing strap assembly is shown. As shown, the performance characteristics may require the ability to control the initial breakaway with a wide range of initial peak loads followed by a low load zone—referred to as "delayed energy absorption zone" herein—which then transitions to a final running load zone.

Figures 3, 4, 5:
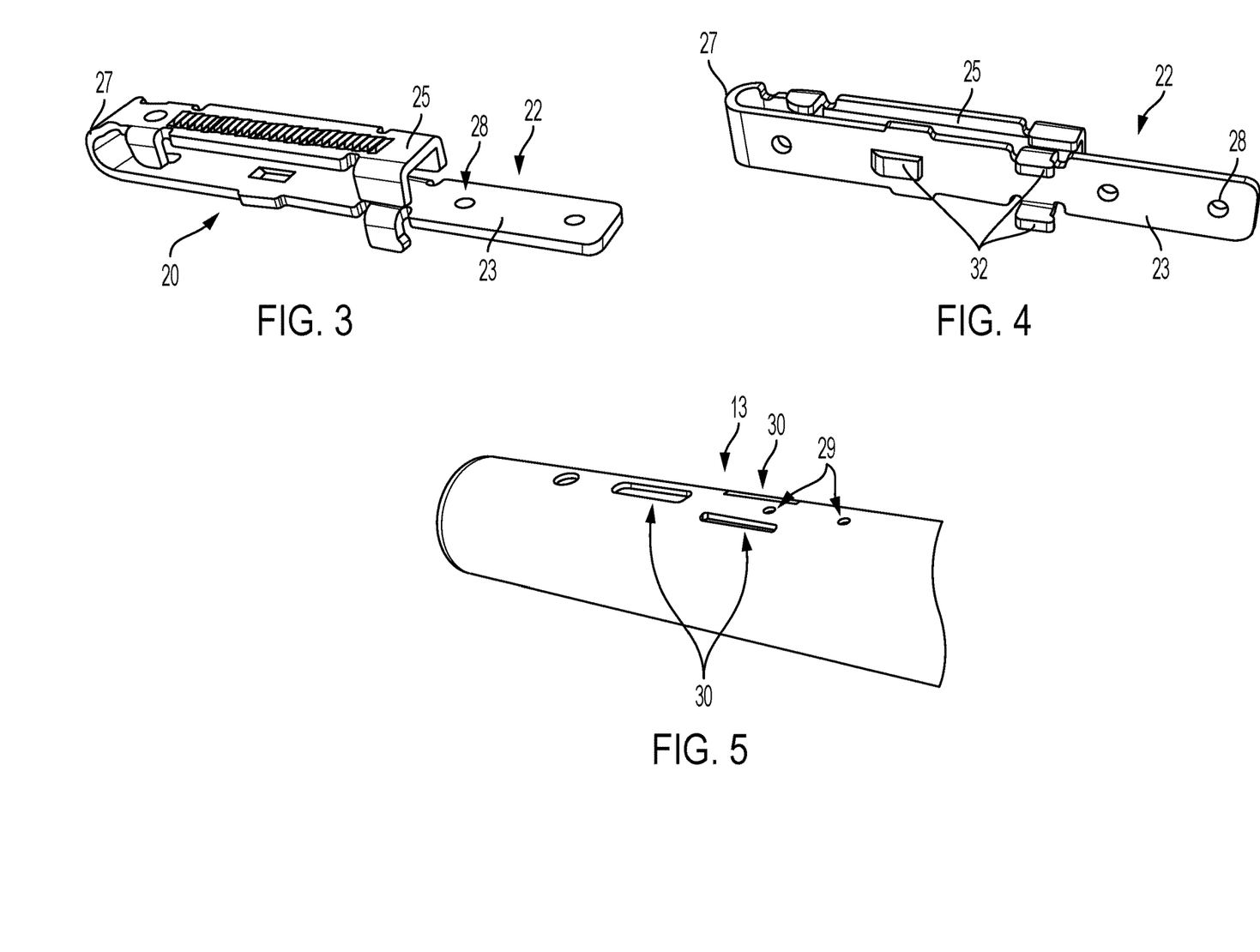
FIG. 3 is a first perspective view of an energy absorbing strap assembly according to an aspect of the disclosure.
FIG. 4 is a second perspective view of the energy absorbing strap assembly of FIG. 3.
FIG. 5 is a perspective view of a portion of an upper jacket of the steering column assembly.

Referring now to FIGS. 3-5, the energy absorption strap assembly (EA strap assembly) 20 is illustrated in detail according to one aspect of the disclosure. In particular, the EA strap assembly 20 includes a "one-piece" EA strap 22. In the illustrated embodiment, the EA strap 22 is a single, integrally formed component.

The EA strap assembly 20 is operatively coupled to the upper jacket 13 to assist with the energy absorbing process during a collapse event. The EA strap 22 has a first leg 23 and a second leg 25 which are oriented substantially parallel to each other in a spaced manner. The first leg 23 and the second leg 25 are joined by a curved segment 27 to form a substantially U-shaped EA strap 22. The first leg 23 extends further from the curved segment 27, relative to the distance that the second leg 25 extends from the curved segment 27 in some embodiments. In such embodiments, the first leg 23 is longer than the second leg 25.

The EA strap 22 includes a stationary portion (which corresponds substantially to the second leg 25) and a moveable portion (which corresponds substantially to the first leg 23) that moves with the upper jacket 13 during an energy absorption event. The stationary portion and the moveable portion are joined by the curved segment 27, as described above.

The first leg 23 defines a plurality of apertures 28. The EA strap 22 is directly coupled to the upper jacket 13 with one or more mechanical fasteners (not shown) that extend through the apertures 28 of the first leg 23 and apertures 29 of the upper jacket 13. Although illustrated in a specific position, it is to be appreciated that the precise location of the apertures 28, 29 and mechanical fastener(s) may vary depending upon the particular application and on various design factors. The illustrated embodiment shows a pair of apertures of the first leg 23 and the upper jacket 13 that the mechanical fasteners couple with, however more or fewer mechanical fasteners and apertures 28, 29 is within the scope of the disclosure. The location where the mechanical fasteners secure the EA strap 22 to the upper jacket 13 via the apertures 28, 29 may be referred to as shear or slip joint attachments and provide initial breakaway load control since substantial relative movement between the upper jacket 13 and the first leg 23 of the EA strap 22 is not permitted while the mechanical fasteners remain intact in the apertures 28, 29 of the EA strap 22 and the upper jacket 13. This retention defines the initial breakaway load control.

As shown in FIGS. 4 and 5, the upper jacket 13 includes at least one slot 30 configured to receive a respective protrusion 32 extending from the first leg 23 of the EA strap 22. As described, interaction between the protrusion(s) 32 and the slot(s) 30 defines a delayed length of displacement for the upper jacket 13 before the running load is achieved. In the illustrated embodiment, three protrusions 32 extend into respective slots 30, but it is to be appreciated that any number of protrusions and corresponding slots may be utilized in various embodiments. At initial assembly, and prior to initial breakaway, each of the protrusion(s) 32 is positioned near a first end 33 of its respective slot 30. After breakaway (i.e., deformation or breakage of the mechanical fasteners located within the apertures 28, 29) the upper jacket 13 moves such that the slots 30 translate relative to the protrusions 32. This movement defines the delay before the final running load. Relative movement between the slots 30 and the protrusion(s) 32 continues until the protrusions 32 engage a second of the slots 30 to activate the EA strap running load profile.

In the illustrated embodiment, the engagement between the protrusion(s) 32 and the upper jacket 13 occurs at an end of the slot(s) 30. However, it is contemplated that other types of features of the EA strap 22 and the upper jacket 13 may interact with each other to control the EA strap running load profile. Generally, the shear features are activated after initial breakaway, thereby allowing the upper jacket 13 to shift forward until the ends of the slot(s) 30 drive the first leg 23 of the EA strap 22 forward.

Figure 6:
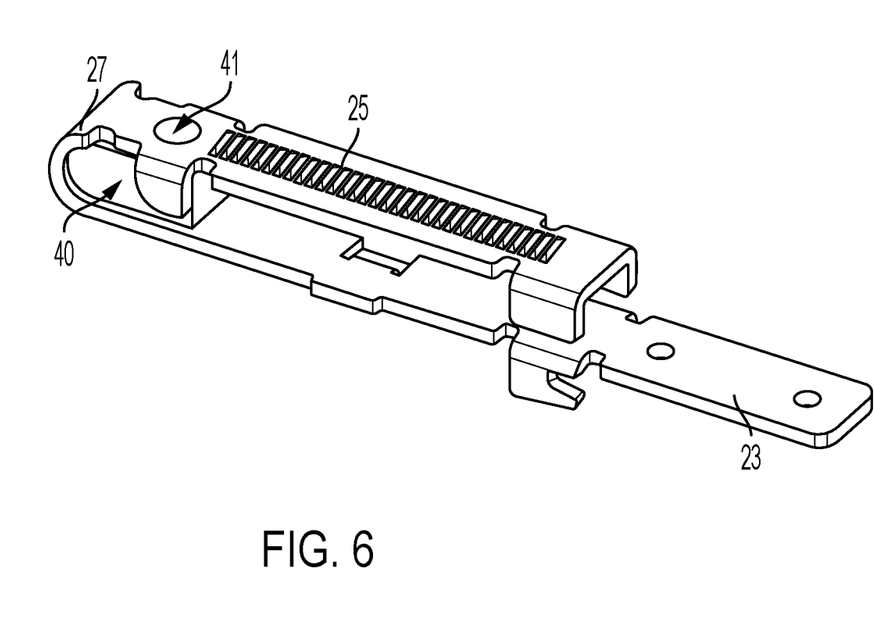
FIG. 6 is a perspective view of the energy absorbing strap assembly of FIGS. 3-5 according to another aspect of the disclosure.
Figure 7:
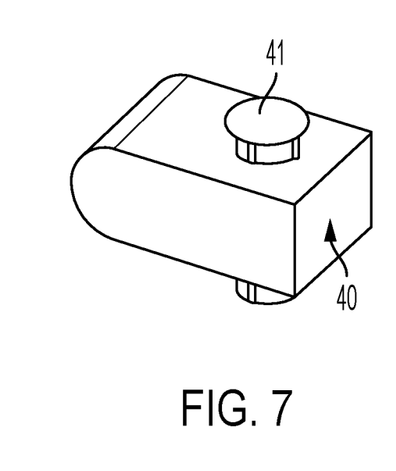
FIG. 7 is a perspective view of a connecting structure of the energy absorbing strap assembly of FIG. 6.

Referring now to FIGS. 6 and 7, the "one-piece" embodiment of FIGS. 3-5 is shown according to another aspect of the disclosure. Specifically, a connecting structure 40 is disposed between the first leg 23 and the second leg 25 proximate the curved segment 27. The connecting structure 40 links the two legs 23, 25 with a shear feature 41, such as a pin or the like, extending through the first leg 23, the connecting structure 40, and the second leg 25. The connecting structure 40 increases the EA strap initial energy absorption load. The connecting structure 40 facilitates use of both low and high load EA straps. For a low load EA strap, the breakaway supports/boosts the EA strap load until the predefined shear load is achieved, then allows the system to activate the low load EA level. The connecting structure 40 may be eliminated for applications that have an EA strap running load that is higher than the requested breakaway load.

Figure 8:
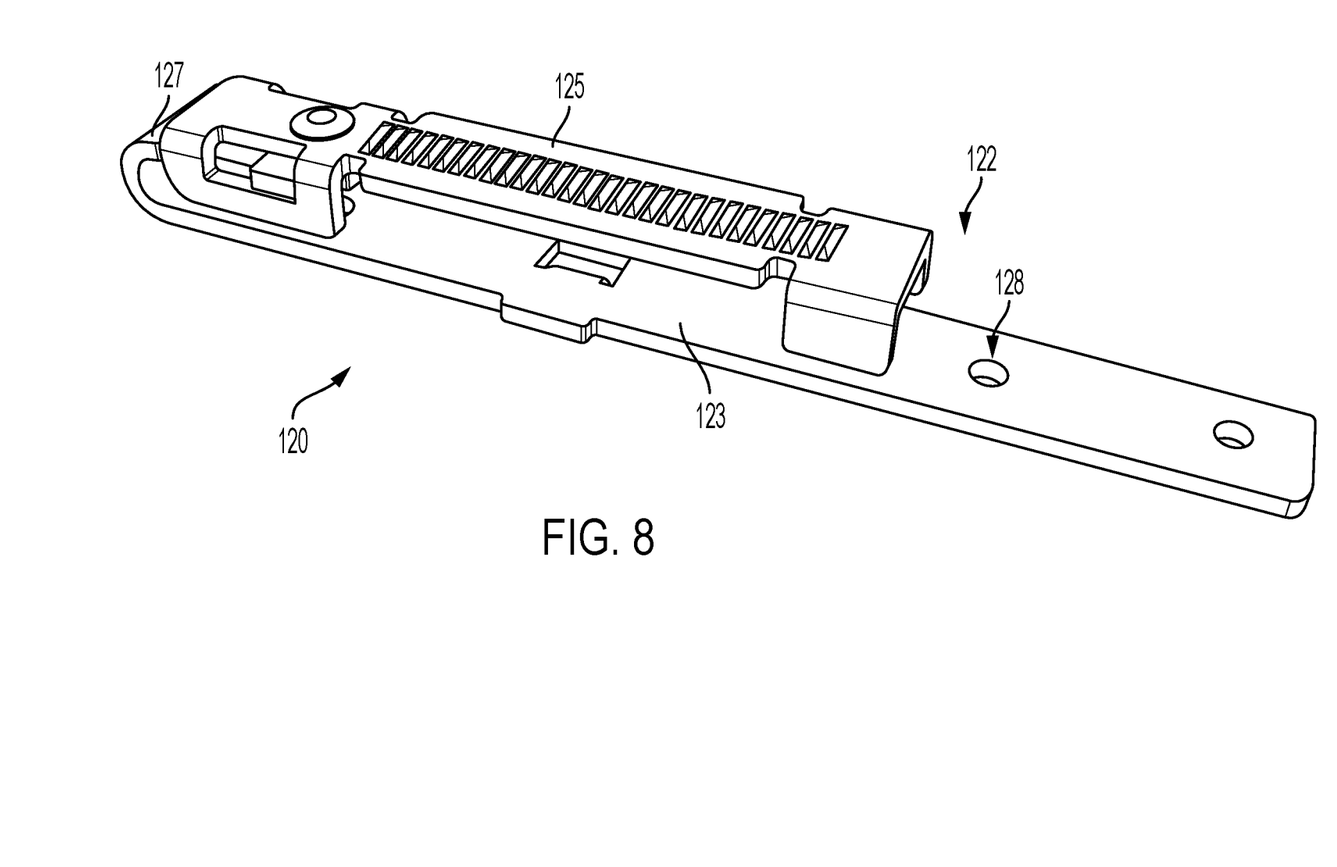
FIG. 8 is a perspective view of the energy absorbing strap assembly according to another aspect of the disclosure.

Referring now to FIG. 8, the energy absorption strap assembly (EA strap assembly) 120 is illustrated in detail according to another aspect of the disclosure. In particular, the EA strap assembly 120 includes a "two-piece" EA strap 122.

The EA strap assembly 120 is operatively coupled to the upper jacket 13 to assist with the energy absorbing process during a collapse event. The EA strap 122 has a first leg 123 and a second leg 125 which are oriented substantially parallel to each other in a spaced manner. The first leg 123 and the second leg 125 are joined by a curved segment 127 to form a substantially U-shaped EA strap 122. The curved segment 127 is integrally formed with the first leg 123 in the illustrated embodiment, but it is contemplated that the curved segment 127 is integrally formed with the second leg 125 in other embodiments. The first leg 123 extends further from the curved segment 127, relative to the distance that the second leg 125 extends from the curved segment 127 in some embodiments. In such embodiments, the first leg 123 is longer than the second leg 125.

The EA strap 122 includes a stationary portion (which corresponds substantially to the second leg 125) and a moveable portion (which corresponds substantially to the first leg 123) that moves with the upper jacket 13 during an energy absorption event. The stationary portion and the moveable portion are joined by the curved segment 127, as described above.

The first leg 123 defines a plurality of apertures 128. The EA strap 122 is directly coupled to the upper jacket 13 with one or more mechanical fasteners (not shown) that extend through the apertures 128 of the first leg 123 and apertures 29 (FIG. 5) of the upper jacket 13. Although illustrated in a specific position, it is to be appreciated that the precise location of the apertures 128, 129 and mechanical fastener(s) may vary depending upon the particular application and on various design factors. The illustrated embodiment shows a pair of apertures of the first leg 123 and the upper jacket 13 that the mechanical fasteners couple with, however more or fewer mechanical fasteners and apertures 128, 129 is within the scope of the disclosure. The location where the mechanical fasteners secure the EA strap 122 to the upper jacket 13 via the apertures 128, 129 may be referred to as shear or slip joint attachments and provide initial breakaway load control since substantial relative movement between the upper jacket 13 and the first leg 123 of the EA strap 122 is not permitted while the mechanical fasteners remain intact in the apertures 128, 129 of the EA strap 122 and the upper jacket 13. This retention defines the initial breakaway load control.

Figure 9:
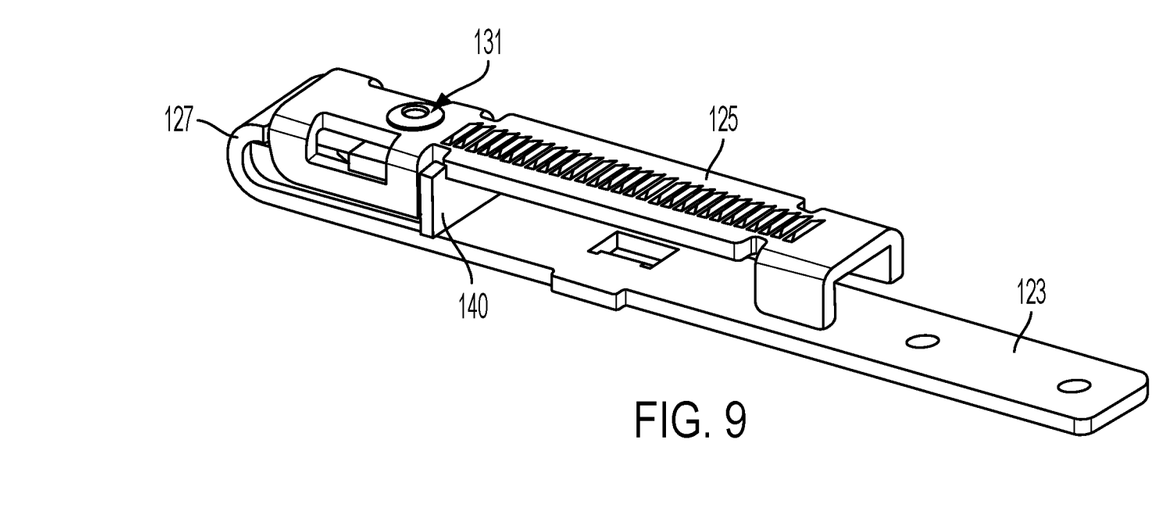
FIG. 9 is a perspective view of the energy absorbing strap assembly of FIG. 8 according to another aspect of the disclosure.
Figure 10:
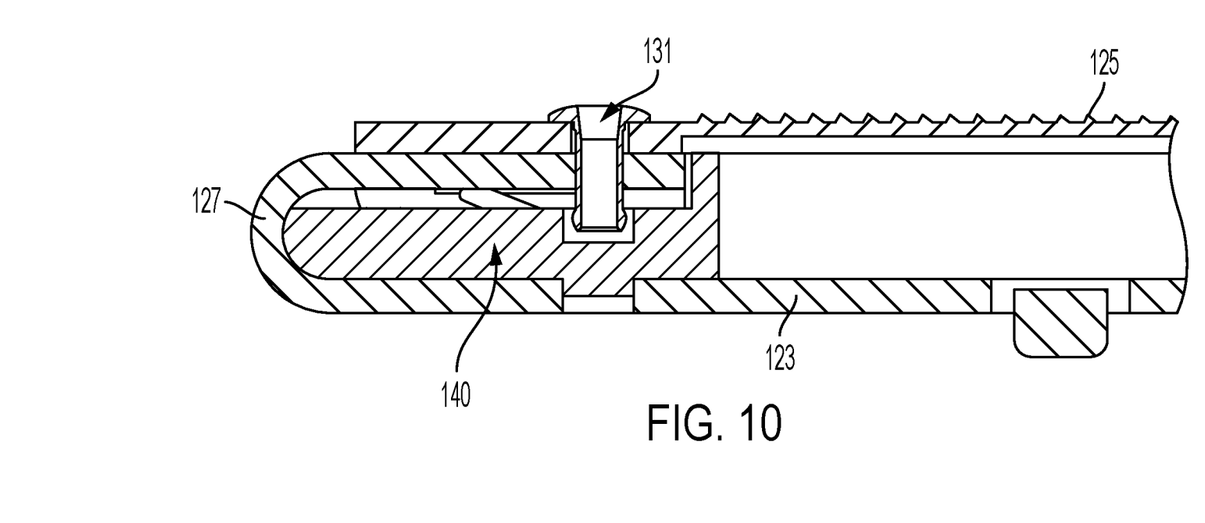
FIG. 10 is a cross-sectional view of the energy absorbing strap assembly of FIG. 9.
Figure 11:
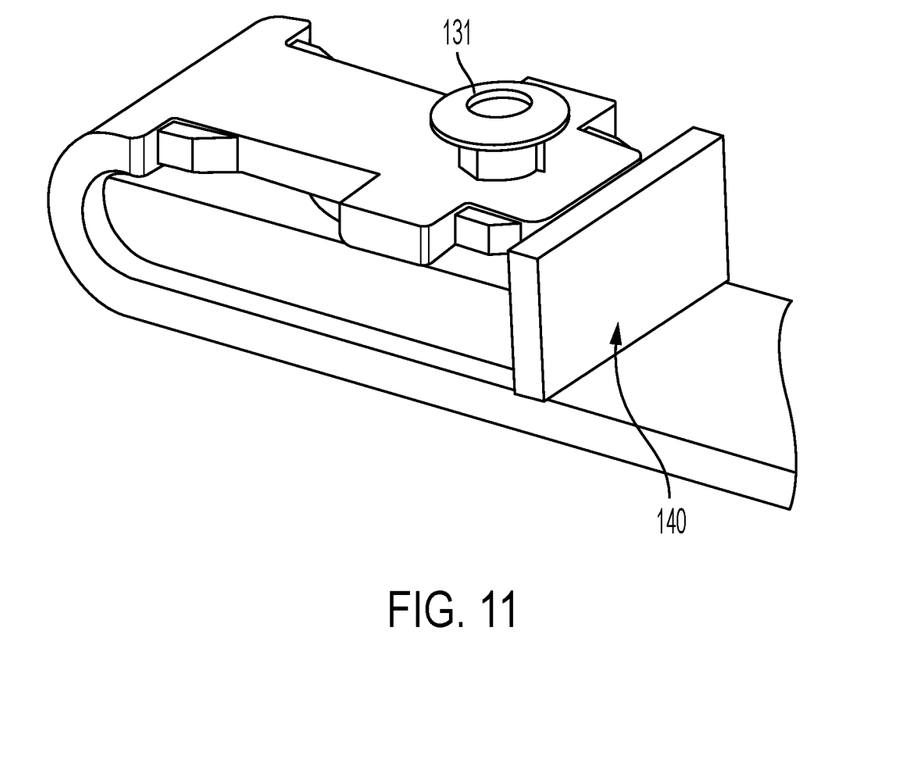
FIG. 11 is a perspective view of a connecting structure of the energy absorbing strap assembly of FIGS. 9 and 10.

Referring now to FIGS. 9-11, the "two-piece" embodiment of FIG. 8 is shown according to another aspect of the disclosure. Specifically, a connecting structure 140 is disposed between the first leg 123 and the second leg 125 proximate the curved segment 127. The connecting structure 140 links the two legs 123, 125 with the shear pin 131 extending through the first leg 123, the connecting structure 140, and the second leg 125. The connecting structure 140 increases the EA strap initial energy absorption load. The connecting structure 140 can remain stationary or move with the upper jacket 13 depending on load requirements. The connecting structure 140 facilitates use of both low and high load EA straps. For a low load EA strap, the breakaway supports/boosts the EA strap load until the requested shear load is achieved, then allows the system to activate the low load EA level. The connecting structure 140 may be eliminated for applications that have an EA strap running load that is higher than the requested breakaway load.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a lower jacket;
   an upper jacket in telescoping engagement with the lower jacket;
   an energy absorbing strap having a first leg portion, a second leg portion and a curved portion connecting the first leg portion and the second leg portion, the first leg portion coupled to the upper jacket, wherein the first leg portion, the second leg portion and the curved portion define a single integrally formed structure;
   a protrusion extending from the energy absorbing strap and disposed within a slot defined by the upper jacket; and
   a connecting structure disposed between the first leg portion and the second leg portion, wherein a pin extends through the first leg portion and the connecting structure, wherein the pin extends through the second leg portion.

2. The steering column assembly of claim 1, further comprising at least one mechanical fastener operatively coupling the upper jacket to the energy absorbing strap.

3. The steering column assembly of claim 2, wherein the protrusion is positioned at a first end of the slot while the at least one mechanical fastener retains the relative position of the upper jacket to the energy absorbing strap.

4. The steering column assembly of claim 3, wherein the upper jacket moves relative to the energy absorbing strap after the at least one mechanical fastener deforms or breaks until the protrusion contacts a wall proximate a second end of the slot.

5. The steering column assembly of claim 1, wherein the protrusion is one of a plurality of protrusions extending from the energy absorbing strap and the slot is one of a plurality of slots defined by the upper jacket, wherein the number of slots corresponds to the number of protrusions.

6. A steering column assembly comprising:
a lower jacket;
an upper jacket in telescoping engagement with the lower jacket;
an energy absorbing strap having a first leg portion and a second leg portion, wherein the first leg portion and the second leg portion are separate components connected with a shear pin;
at least one protrusion extending from the first leg portion into a slot defined by the second leg portion; and
a connecting structure disposed between the first leg portion and the second leg portion, wherein a pin extends through the first leg portion and the connecting structure, wherein the pin extends through the second leg portion.

7. The steering column assembly of claim 6, further comprising at least one mechanical fastener operatively coupling the upper jacket to the energy absorbing strap.

8. The steering column assembly of claim 7, wherein the protrusion is positioned at a first end of the slot while the at least one mechanical fastener retains the relative position of the upper jacket to the energy absorbing strap.

9. The steering column assembly of claim 8, wherein the upper jacket moves relative to the energy absorbing strap after the at least one mechanical fastener deforms or breaks until the protrusion contacts a wall proximate a second end of the slot.

10. The steering column assembly of claim 6, wherein the protrusion is one of a plurality of protrusions extending from the energy absorbing strap and the slot is one of a plurality of slots defined by the upper jacket, wherein the number of slots corresponds to the number of protrusions.

\* \* \* \* \*